(12) United States Patent
Tannhäuser et al.

(10) Patent No.: US 12,462,994 B2
(45) Date of Patent: Nov. 4, 2025

(54) CIRCUIT BREAKER DEVICE AND METHOD

(71) Applicant: Siemens Aktiengesellschaft, Munich (DE)

(72) Inventors: Marvin Tannhäuser, Hausen (DE); Dominic Malane, Eichstätt (DE); Fabian Döbler, Theilenhofen (DE)

(73) Assignee: Siemens Akteingesellschaft, Munich (DE)

( * ) Notice: Subject to any disclaimer, the term of this patent is extended or adjusted under 35 U.S.C. 154(b) by 183 days.

(21) Appl. No.: 18/258,611

(22) PCT Filed: Dec. 21, 2021

(86) PCT No.: PCT/EP2021/087071
§ 371 (c)(1),
(2) Date: Jun. 21, 2023

(87) PCT Pub. No.: WO2022/136421
PCT Pub. Date: Jun. 30, 2022

(65) Prior Publication Data
US 2024/0038466 A1    Feb. 1, 2024

(30) Foreign Application Priority Data
Dec. 21, 2020 (DE) ..................... 10 2020 216 416.9
Dec. 20, 2021 (EP) ..................... 21216109

(51) Int. Cl.
    *H01H 33/59*       (2006.01)
    *H01H 9/54*       (2006.01)

(52) U.S. Cl.
CPC .......... *H01H 33/593* (2013.01); *H01H 9/542* (2013.01); *H01H 9/548* (2013.01); *H01H 2009/544* (2013.01)

(58) Field of Classification Search
CPC ....... H01H 33/593; H01H 9/542; H01H 9/548
See application file for complete search history.

(56) References Cited

U.S. PATENT DOCUMENTS 9,502,974 B2 * 11/2016 Archibald ............. H02M 3/156
2005/0162788 A1 * 7/2005 Boudaud .................. H02H 3/33
                                                                    361/42

(Continued)

FOREIGN PATENT DOCUMENTS

DE    202009014759 U1    3/2010
DE    102020216396 B3    5/2022

(Continued)

*Primary Examiner* — Scott Bauer
(74) *Attorney, Agent, or Firm* — Laurence A. Greenberg; Werner H. Stemer; Ralph E. Locher (57) ABSTRACT

A circuit breaker for a low-voltage electric circuit includes a mechanical break contact unit which is connected in series with an electronic interrupting unit. The mechanical break contact unit is switched by breaking contacts to prevent current from flowing or by closing the contacts to allow current to flow in the low-voltage circuit. The electronic interrupting unit switches semiconductor-based switching elements into a high-impedance state to prevent current from flowing or into a low-impedance state to allow current to flow in the low-voltage circuit. The amplitude of the current in the low-voltage circuit is ascertained as instantaneous current values. If the instantaneous current value is exceeded relative to at least one current threshold value, prevention of current flowing in the low-voltage circuit is initiated. The at least one current threshold value is adapted in dependence on the amplitude of the current in the low-voltage circuit.

18 Claims, 5 Drawing Sheets

(56) References Cited

U.S. PATENT DOCUMENTS

| | | |
|---|---|---|
| 2017/0004948 A1 | 1/2017 | Leyh |
| 2020/0366078 A1 | 11/2020 | Telefus et al. |
| 2022/0060011 A1* | 2/2022 | Yousef .................... H03K 5/24 |

FOREIGN PATENT DOCUMENTS

| | | |
|---|---|---|
| DE | 102020216397 B3 | 5/2022 |
| DE | 102020216413 A1 | 6/2022 |
| DE | 102020216416 A1 | 6/2022 |
| EP | 0416569 A2 | 3/1991 |
| EP | 3700038 A1 | 8/2020 |
| WO | WO 2020169753 A1 | 8/2020 |
| WO | WO 2020169765 A1 | 8/2020 |
| WO | WO 2020169773 A1 | 8/2020 |
| WO | WO 2020169774 A1 | 8/2020 |
| WO | WO 2020169780 A1 | 8/2020 |

* cited by examiner

CIRCUIT BREAKER DEVICE AND METHOD

FIELD AND BACKGROUND OF THE INVENTION

The invention relates to the technical field of a circuit breaker device for a low-voltage circuit having an electronic interruption unit and to a method for a circuit breaker device for a low-voltage circuit having an electronic interruption unit.

Low voltage is understood to mean voltages of up to 1000 volts AC or up to 1500 volts DC. Low voltage is understood in particular to mean voltages that are greater than extra-low voltage, with values of 50 volts AC or 120 volts DC.

A low-voltage circuit or grid or installation is understood to mean circuits with nominal currents or rated currents of up to 125 amperes, more specifically up to 63 amperes. A low-voltage circuit is understood to mean in particular circuits with nominal currents or rated currents of up to 50 amperes, 40 amperes, 32 amperes, 25 amperes, 16 amperes or 10 amperes. Said current values are understood to mean in particular nominal, rated or/and shutdown currents, that is to say the maximum current that is normally carried through the circuit or in the case of which the electrical circuit is usually interrupted, for example by a protection device, such as a circuit breaker device, miniature circuit breaker or power circuit breaker.

Miniature circuit breakers are overcurrent protection devices that have long been known and that are used in low-voltage circuits in electrical installation engineering. They protect lines against damage caused by heating due to excessively high current and/or a short circuit. A miniature circuit breaker may automatically shut down the circuit in the event of an overload and/or short circuit. A miniature circuit breaker is not a safety element that resets automatically.

In contrast to miniature circuit breakers, power circuit breakers are intended for currents greater than 125 A, in some cases also starting from 63 amperes. Miniature circuit breakers therefore have a simpler and more delicate design. Miniature circuit breakers usually have a fastening option for fastening to a so-called top-hat rail (carrier rail, DIN rail, TH35).

Miniature circuit breakers have an electromechanical design. In a housing, they have a mechanical switching contact or operating current tripping device for interrupting (tripping) the electric current. A bimetal protection element or bimetal element is usually used for tripping (interruption) in the event of a sustained overcurrent (overcurrent protection), respectively in the event of a thermal overload (overload protection). An electromagnetic tripping device with a coil is used for brief tripping in the event of an overcurrent limit value being exceeded or in the event of a short circuit (short circuit protection). One or more arc extinguishing chambers or arc extinguishing devices are provided. Connection elements for conductors of the electrical circuit to be protected are also provided.

Circuit breaker devices having an electronic interruption unit are relatively recent developments. They have a semiconductor-based electronic interruption unit. In other words, the electric current flow in the low-voltage circuit is guided via semiconductor components or semiconductor switches that are able to interrupt the electric current flow or are able to be switched to the on state. Circuit breaker devices having an electronic interruption unit often also have a mechanical isolating contact system, in particular with isolator properties in accordance with the applicable standards for low-voltage circuits, wherein the contacts of the mechanical isolating contact system are connected in series with the electronic interruption unit, that is to say the current of the low-voltage circuit to be protected is guided both through the mechanical isolating contact system and through the electronic interruption unit.

In the case of semiconductor-based circuit breaker devices or protection devices, or solid-state circuit breakers, SSCB for short, the switching energy does not, like in the case of a mechanical switching device, have to be converted into an arc, but rather converted into heat by way of an additional circuit, the energy absorber. The shutdown energy in this case comprises the energy stored in the circuit, that is to say in the grid impedances, line impedances or load impedances (consumer impedances). To unload the energy absorber, the current flowing at the time of shutdown has to be as low as possible. This also applies to the case of a short circuit. In this case, the current rises very quickly. Quickly recognizing a short circuit makes it possible to recognize a short circuit early and to avoid an excessively high short-circuit current. The semiconductor-based circuit breaker device interrupts the circuit almost without a delay, within µs, as part of a shutdown process. No high currents occur and the loading of the energy absorber of a semiconductor-based circuit breaker device is reduced. Known short-circuit recognitions or shutdown criteria are usually based on ascertaining and evaluating the current actual value.

The present invention relates to low-voltage AC circuits having an AC voltage, usually having a time-dependent sinusoidal AC voltage of frequency f, typically 50 or 60 hertz (Hz). The temporal dependency of the instantaneous voltage value u(t) of the AC voltage is described by the equation:

$$u(t) = U^* \sin(2\pi^* f^* t),$$

wherein:
u(t)=instantaneous voltage value at the time t
U=amplitude (maximum value) of the voltage A harmonic AC voltage may be represented by the rotation of a vector the length of which corresponds to the amplitude (U) of the voltage. The instantaneous deviation is in this case the projection of the vector onto a coordinate system. An oscillation period corresponds to a full revolution of the vector and its full angle is 2π (2pi) or 360°. The angular frequency is the rate of change of the phase angle of this rotating vector. The angular frequency of a harmonic oscillation is always 2π times its frequency, that is to say:

$$\omega = 2\pi^* f = 2\pi/T = \text{angular frequency of the AC voltage}$$

(T=period duration of the oscillation).

It is often preferred to give the angular frequency (ω) rather than the frequency (f), since many formulae in oscillation theory are able to be represented more compactly using the angular frequency due to the occurrence of trigonometric functions the period of which is by definition 2π:

$$u(t) = U^* \sin(\omega t)$$

In the case of non-temporally constant angular frequencies, the term instantaneous angular frequency is also used.

In the case of a sinusoidal, in particular temporally constant, AC voltage, the time-dependent value formed from the angular velocity ω and time t corresponds to the time-dependent angle φ(t), which is also referred to as phase angle φ(t). In other words, the phase angle φ(t) periodically runs through the range 0 . . . 2π or 0° . . . 360°. In other words, the phase angle periodically adopts a value between 0 and $2\pi$ or 0° and 360° ($\varphi=n*(0 \ldots 2\pi)$ or $\varphi=n*(0°) \ldots 360°$, owing to periodicity; for short: $\varphi=0 \ldots 2\pi$ or $\varphi=0° \ldots 360°$.

Instantaneous voltage value u(t) is therefore understood to mean the instantaneous value of the voltage at the time t, that is to say, in the case of a sinusoidal (periodic) AC voltage, the value of the voltage at the phase angle $\varphi$ ($\varphi=0 \ldots 2\pi$ or $\varphi=0° \ldots 360°$, of the respective period).

SUMMARY OF THE INVENTION

The object of the present invention is to improve a circuit breaker device of the type mentioned at the outset, in particular to give a possibility, in the event of an occurring short circuit or overcurrent, that is to say in the event of at least one current threshold value being exceeded, for the electronic interruption unit to safely avoid an electric current flow.

This object is achieved by a circuit breaker device having the features as claimed, and by a method as claimed.

According to the invention, provision is made for an (electronic) circuit breaker device for protecting an electrical low-voltage circuit, in particular low-voltage AC circuit, having:

- a housing, having first, in particular grid-side, and second, in particular load-side, connections for conductors of the low-voltage circuit,
- a mechanical isolating contact unit that is connected in series with an electronic interruption unit, wherein in particular the mechanical isolating contact unit is assigned to the (second) load-side connections and the electronic interruption unit is assigned to the (first) grid-side connections,
- wherein the mechanical isolating contact unit is able to be switched by opening contacts so as to avoid a current flow or closing the contacts to allow a current flow in the low-voltage circuit,
- wherein the electronic interruption unit is able to be switched by semiconductor-based switching elements to a high-resistance state of the switching elements so as to avoid a current flow or a low-resistance state of the switching elements so as to allow a current flow in the low-voltage circuit,
- a current sensor unit for ascertaining the level of the current of the low-voltage circuit, such that instantaneous current values are present,
- in particular in one embodiment, a voltage sensor unit for ascertaining the level of the voltage of the low-voltage circuit such that instantaneous voltage values are present,
- a control unit that is connected to the current sensor unit (the voltage sensor unit), the mechanical isolating contact unit and the electronic interruption unit, wherein, in the event of at least one current threshold value being exceeded, avoidance of a current flow in the low-voltage circuit is initiated (in particular by the electronic interruption unit),
- wherein the circuit breaker device is designed such that the at least one current threshold value is adapted on the basis of the level of the current in the low-voltage circuit.

This has the particular advantage that the circuit breaker device, in the event of an occurring overcurrent or short circuit, is able to safely avoid this, that is to say shut down, in particular by way of the electronic interruption unit. In this connection, safely means here that the semiconductor-based switching elements (for example power semiconductors) are protected against thermal destruction. The shutdown performance of the electronic interruption unit, in particular its semiconductor-based switching elements ((power) semiconductors), is limited by the (present) current or by the (present) temperature of the (power) semiconductor, in particular by the amount of energy provided at high currents, which could lead to thermal overloading. In order to achieve safe shutdown (in particular to guarantee this in the event of at least one current threshold value being exceeded) without oversizing the electronic interruption unit, in particular its semiconductor-based switching elements ((power) semiconductors), the level of the at least one current threshold value is adapted on the basis of the level of the current in the low-voltage circuit. According to the invention, this thus makes it possible to achieve high efficiency and better economic use with units of a simple design.

Advantageous embodiments of the invention are indicated in the dependent claims.

In one advantageous embodiment of the invention, the circuit breaker device is designed such that the at least one current threshold value is adapted on the basis of the level of the instantaneous current value.

In one advantageous embodiment of the invention, the circuit breaker device is designed such that the at least one current threshold value is adapted on the basis of the level of the RMS value or an average value of the current.

In one advantageous embodiment, the current threshold value is adapted on the basis of the RMS value of the current of a grid period; in particular, in the case of the higher RMS value, compared to a nominal current of the device, the current threshold value is reduced. Nominal current is understood to mean the current that has to be carried at all times by the circuit breaker device; it is defined in the relevant standards. Normal nominal currents are for example 16 A, 10 A, 32 A.

In a further advantageous embodiment, the current threshold value is adapted on the basis of the average value of the RMS value of the current over a third time interval. The third time interval is in this case for example 3, 4, 5 or 10, 20, 30, 50 grid periods. For example, in the case of 10 grid periods, an average value of the RMS value is formed over 200 ms and, in particular in the case of a relatively high average value of the RMS value, compared to the nominal current of the device, the current threshold value is reduced.

This has the particular advantage that an instantaneous value-related or RMS value-related (average value-related) adaptation takes place.

In one advantageous embodiment of the invention, the circuit breaker device is designed such that the at least one current threshold value is adapted on the basis of the level of the current such that, in the case of an increasing current, the at least one current threshold value is reduced and that, in the case of a decreasing current, the at least one current threshold value is increased, in particular is increased up to a maximum value of the at least one current threshold value.

Advantageously, in the case of high currents, the current threshold value (the current threshold) is thus reduced, since, at high currents, there may be a high input of heat that is thus recognized better in order thus to make maximum use of the current-carrying capability or thermal capacity, in particular of the electronic interruption unit, more specifically of its (power) semiconductor, and at the same time the (power) semiconductor of the electronic interruption unit is protected against thermal destruction.

In one advantageous embodiment of the invention, the circuit breaker device is designed such that the at least one current threshold value is continually adapted. An adaptation that is performed faster than 10 s, 5 s, 1 s, 200 ms, 100 ms, 50 ms, 20 ms, 10 ms or faster than 1 ms may furthermore in particular also take place (all intermediate values are possible and disclosed).

This has the particular advantage of quickly carrying along the current threshold value in order thus to achieve a maximum degree of use of the electronic interruption unit, in particular its (power) semiconductor/semiconductor-based switching element, and a good economic degree of use is thus achieved.

In one advantageous embodiment of the invention, the circuit breaker device is designed such that the instantaneous current value of the ascertained level of the current is compared with the at least one current threshold value by way of an analog comparator such that, in the event of the (analog) instantaneous current value (in particular its absolute value) exceeding the (in particular absolute value of the) at least one (analog) current threshold value, the avoidance of the current flow in the low-voltage circuit is initiated.

The absolute value of the current exceeding the absolute value of the at least one current threshold value in this connection should expediently be understood to mean the exceedance of the current threshold value in the case of a positive current value and the falling below of a negative current threshold value (equal in terms of absolute value) in the case of a negative current value (AC current). This could also be achieved through an absolute value comparison.

This has the particular advantage of achieving fast avoidance of a current flow (shutdown), in particular through the electronic interruption unit.

Instantaneous current value is understood to mean for example an analog instantaneous current value that represents the level of the current through an equivalent, such as a voltage (voltage signal), wherein the level of the voltage represents the level of the current. By way of example, an analog instantaneous current value is an analog measured value of the current that is present as a voltage signal that represents the current characteristic as an equivalent.

Instantaneous current threshold value is understood to mean for example an analog instantaneous current threshold value that indicates the level of the current through an equivalent, such as a voltage (voltage signal), wherein the level of the voltage represents the level of the current. By way of example, the analog instantaneous current threshold value is an analog signal that is present as a voltage (signal) that represents the instantaneous current threshold value (characteristic) as an equivalent.

In one advantageous embodiment of the invention, the circuit breaker device is designed such that the at least one current threshold value is computed digitally (by the control unit or for example by a microprocessor or microcontroller contained therein), the computed digital current threshold value is converted into an analog current threshold value by a digital-to-analog converter,
the analog current threshold value is supplied to the comparator.

This has the particular advantage that the processing speed of an analog circuit (typically in the range of a few nanoseconds [ns], for example 5-10 ns) is combined with the flexibility of a digital programmable and intelligent system (for example microprocessor/microcontroller).

The analog comparator operates in a time-continuous manner, that is to say not in a time-discrete manner. It is thus possible to recognize an overcurrent (exceedances of current threshold value) in a very short time. A microprocessor/microcontroller operates as a time-discrete controller, such that the reaction time is limited to the processing cycle, which is typically in the range from 10-100 μs.

This combination makes it possible to maintain the flexibility and adaptability of a digital (instantaneous) current threshold value and at the same time to achieve the high reaction time of the analog circuit. This is possible since the adaptation of the current threshold value does not have to take place in the nanosecond range/ns, and only the comparison thereof with the (present) instantaneous value of the current value should be performed in the ns range, which is possible by virtue of this arrangement/combination.

In one advantageous embodiment of the invention, the circuit breaker device is designed such that the (analog) instantaneous current values are converted into digital current values,
that, in the event of the RMS value of the current exceeding the nominal current of the circuit breaker device for a first time interval, the at least one current threshold value is reduced by a percentage dependent on the level of the exceedance of the nominal current in order to obtain an adapted current threshold value.

This has the particular advantage that, in the case of high currents, the current threshold value (the current threshold) is reduced, since, in the case of high currents, there is a high input of heat and it is thus possible to make maximum use of the current-carrying capability or thermal capacity, in particular of the electronic interruption unit, more specifically its (power) semiconductor, and at the same time the (power) semiconductor of the electronic interruption unit is protected against thermal destruction.

In one advantageous embodiment of the invention, the circuit breaker device is designed such that the instantaneous current values are converted into digital current values, a digital current value is reduced by a correction value and the result is subtracted from the at least one current threshold value in order to obtain an adapted current threshold value.

This has the particular advantage of giving a further particularly simple computation or adaptation of the current threshold value on the basis of the level of the current.

In one advantageous embodiment of the invention, the circuit breaker device is designed such that the instantaneous current values are converted into digital current values, an RMS value or/and an RMS value averaged over a first time interval is computed from the digital current values, the current threshold value is adapted on the basis of the level by which the RMS value or averaged RMS value exceeds the nominal current in order to obtain an adapted current threshold value.

For example, in the event of the averaged RMS value exceeding the nominal current of the circuit breaker device by for example 20%, the current threshold value is reduced by for example 20%. A different scaling of the current threshold value is likewise possible.

This has the particular advantage of giving further particularly simple computation or adaptation of the current threshold value on the basis of the level of the current.

In one advantageous embodiment of the invention, in which provision is made for a voltage sensor unit connected to the control unit, so as to ascertain the level of the voltage of the low-voltage circuit such that instantaneous voltage values are present,
instantaneous current threshold values (in particular periodic ones) that are dependent on the (in particular periodic) temporal characteristic of the level of the voltage (in particular AC voltage), that is to say on the instantaneous voltage values, are present.

The instantaneous current values are compared (in particular in terms of phase) with the instantaneous current threshold values. In the event of the instantaneous current threshold value being exceeded (in particular in terms of absolute value), interruption of the low-voltage circuit is initiated.

This has the particular advantage that threshold values/current threshold values dependent on the periodicity of the voltage are present in order to achieve fast current flow avoidance (tripping), in particular by way of the electronic interruption unit. In the case of high currents, small current threshold values are used.

In one advantageous embodiment of the invention, the (periodic) instantaneous current threshold values have a minimum value that is greater than zero. This minimum value is in particular in the range of 5 to 20% of the maximum value, that is to say of the maximum current threshold value.

This has the particular advantage, in the case of small current threshold values or small voltages, of enabling safe and fast recognition of short-circuit currents and avoiding incorrect tripping.

In one advantageous embodiment of the invention, the low-voltage circuit has a temporally sinusoidal voltage characteristic (ideal case). The low-voltage circuit is in particular a low-voltage AC circuit. The instantaneous current threshold values likewise have a temporally (approximately) sinusoidal current characteristic, in particular in terms of absolute value. The zero-crossing or the region of the zero-crossing in particular has a minimum value (in terms of absolute value) that is greater than zero; this minimum value is in particular greater than 5%, 10% or 20% of the maximum value; particularly specifically this minimum value is in the range from 5 to 20% of the maximum value, that is to say of the maximum current threshold value. The temporal characteristics of voltage and current threshold values are synchronized in terms of phase such that the time of the amplitude (maximum value) of the voltage matches the time of the amplitude (maximum value) of the current threshold value.

This has the particular advantage of enabling simple recognition in the case of (in particular) sinusoidal voltage characteristics. This is particularly advantageous for low-voltage circuits.

In particular, the region of the zero-crossing of the voltage matches the region of the minimum value of the current threshold value.

In one advantageous embodiment of the invention, the circuit breaker device is designed such that the control unit has an analog first subunit and a digital second subunit. The first subunit has an (analog) (current) comparator to which the instantaneous (analog) current values and the instantaneous (analog) current threshold values are supplied, the latter in particular from the second subunit. The current threshold values are provided in terms of phase by the second subunit in accordance with the temporal characteristic of the voltage. This makes it possible to compare the instantaneous current values with the instantaneous current threshold values in relation to the phase of the temporal profile of the voltage. As a result of this, it is possible to initiate interruption of the low-voltage circuit in the event of the (instantaneous) current threshold values being exceeded.

This has the particular advantage of a simple implementation of the solution.

In one advantageous embodiment of the invention, the circuit breaker device is designed such that provision is made for a grid synchronization unit. This ascertains at least one phase angle ($\varphi(t)$) of the voltage and, alternatively, the amplitude (U) of the voltage from the supplied instantaneous voltage values. Provision is made for a threshold value unit that is connected to the grid synchronization unit such that instantaneous current threshold values are ascertained using the phase angle ($\varphi(t)$) of the voltage, the amplitude (U) of the voltage and a maximum limit value/threshold value for the current threshold value. The instantaneous current values are compared with the instantaneous current threshold values in terms of phase so as to ascertain initiation of avoidance of the current flow (interruption).

This has the particular advantage of a further simple implementation of the solution.

Advantageously, avoidance of the current flow is initiated primarily by the electronic interruption unit. In addition, or in the presence of further criteria, galvanic interruption may be initiated by the mechanical isolating contact system.

According to the invention, what is claimed is a corresponding method for a circuit breaker device for a low-voltage circuit having electronic (semiconductor-based) switching elements, having the same and further advantages.

In the method for protecting an electrical low-voltage circuit in a circuit breaker device having a mechanical isolating contact unit that is connected in series with an electronic interruption unit,
  wherein the mechanical isolating contact unit is able to be switched by opening contacts so as to avoid a current flow or closing the contacts to allow a current flow in the low-voltage circuit,
  wherein the electronic interruption unit is able to be switched by semiconductor-based switching elements to a high-resistance state of the switching elements so as to avoid a current flow or a low-resistance state of the switching elements so as to allow a current flow in the low-voltage circuit,
  wherein the level of the voltage of the low-voltage circuit is ascertained such that instantaneous voltage values are present,
  wherein the level of the current of the low-voltage circuit is ascertained such that instantaneous current values are present,
  wherein, in the event of the instantaneous current value (in particular its absolute value) being exceeded compared to (in particular the absolute value of the) at least one current threshold value, avoidance of the current flow in the low-voltage circuit is initiated,
  the at least one current threshold value is adapted on the basis of the level of the current in the low-voltage circuit.

In one advantageous embodiment of the invention, the at least one current threshold value is adapted on the basis of the level of the current such that, in the case of an increasing current, the at least one current threshold value is reduced and that, in the case of a decreasing current, the at least one current threshold value is increased, in particular is increased up to a maximum value of the at least one current threshold value.

In one advantageous embodiment of the invention, in the event of a nominal current of the circuit breaker device being exceeded, the at least one current threshold value is reduced by a percentage dependent on the level of the exceedance of the nominal current in order to obtain an adapted current threshold value.

In the event of the nominal current being exceeded, the RMS value or the value of the RMS value averaged over a first time interval (average value of the RMS value over the first time interval) may be used for the comparison with the nominal current.

According to the invention, what is claimed is a corresponding computer program product. The computer program product comprises commands that, when the program is executed by a microcontroller (=microprocessor), prompt same to improve the safety of such a circuit breaker device or to achieve higher safety in the electrical low-voltage circuit to be protected by the circuit breaker device, specifically such that the electronic interruption unit safely avoids an electric current flow. The microcontroller (=microprocessor) is part of the circuit breaker device, in particular of the control unit.

According to the invention, what is claimed is a corresponding computer-readable storage medium on which the computer program product is stored.

According to the invention, what is claimed is a corresponding data carrier signal that transmits the computer program product.

All embodiments, both in dependent form referring back to the independent claim(s), and referring back only to individual features or combinations of features of patent claims, bring about an improvement in a circuit breaker device for fast and safe shutdown in the event of overcurrents and short circuits and avoids thermal destruction of the semiconductor-based switching elements that are used in the event of overcurrents and short circuits.

The described properties, features and advantages of this invention and the way in which these are achieved will become clearer and more clearly comprehensible in connection with the following description of the exemplary embodiments, which are explained in more detail in connection with the drawing.

DETAILED DESCRIPTION OF THE INVENTION

Figure 1:
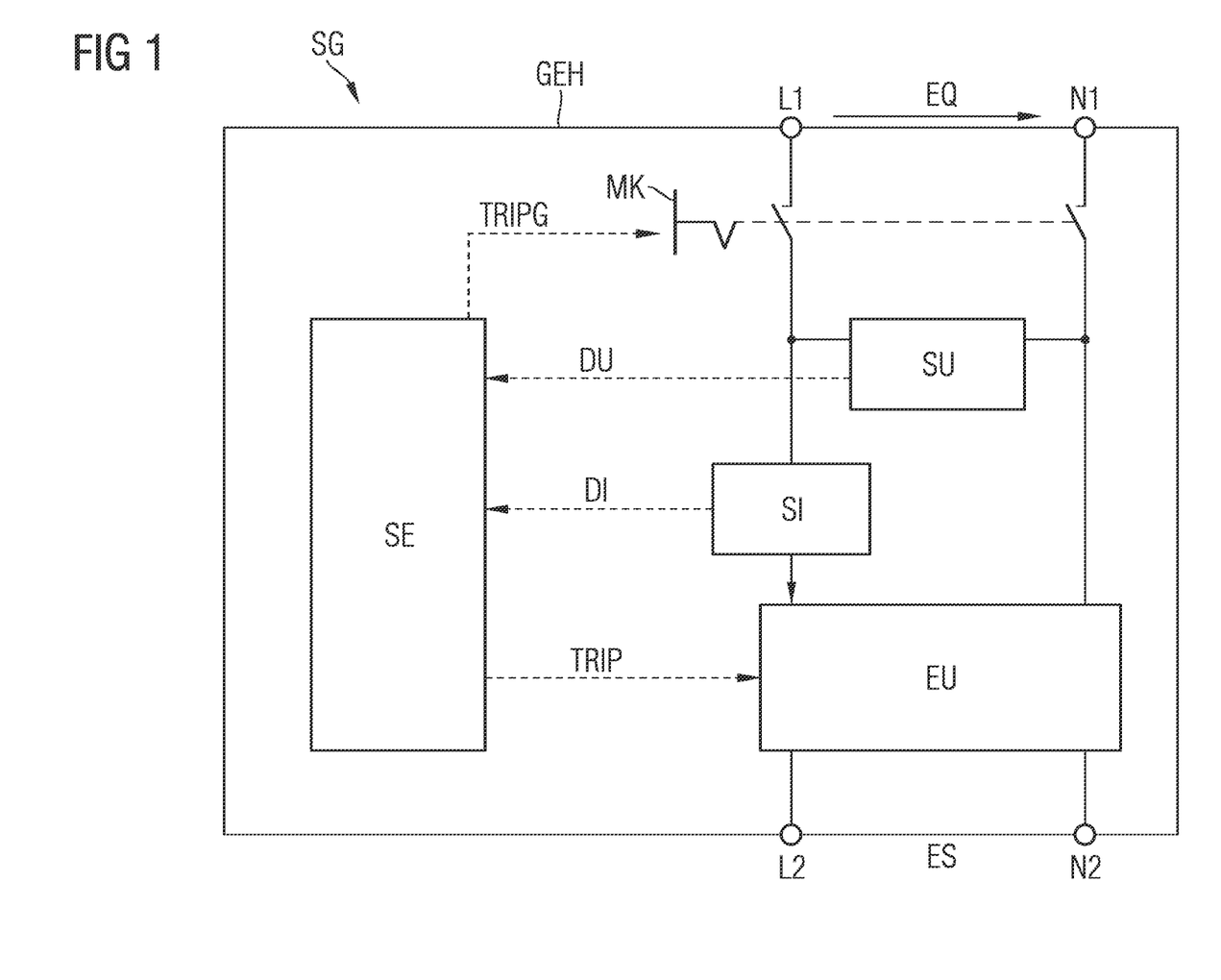
FIG. 1 shows a first illustration of a circuit breaker device.

FIG. 1 shows an illustration of a circuit breaker device SG for protecting an electrical low-voltage circuit, in particular low-voltage AC circuit, having a housing GEH, having:
  connections for conductors of the low-voltage circuit, in particular first connections L1, N1 for a grid-side, in particular energy source-side, connection EQ of the circuit breaker device SG and second connections L2, N2 for a load-side, in particular energy sink-side in the case of passive loads, connection ES (consumer-side connection) of the circuit breaker device SG, wherein provision may be made specifically for phase conductor-side connections L1, L2 and neutral conductor-side connections N1, N2;
the load-side connection may have a passive load (consumer) or/and an active load ((further) energy source), or a load, which may be both passive and active, for example in a time sequence;
  a voltage sensor unit SU for ascertaining the level of the voltage of the low-voltage circuit such that instantaneous voltage values (phase-related voltage values) DU are present; instantaneous (phase angle-related) voltage values are understood to mean in particular analog instantaneous voltage values, that is to say for example an analog equivalent, that indicates the level of the voltage, for example an analog voltage, the level of which corresponds to that of the voltage,
  a current sensor unit SI for ascertaining the level of the current of the low-voltage circuit such that instantaneous (phase angle-related) current values DI are present; instantaneous (phase angle-related) current values are understood to mean in particular analog instantaneous current values, that is to say for example an analog equivalent that indicates the level of the current, for example an analog voltage, the level of which corresponds to that of the electric current,
  an electronic interruption unit EU that, by virtue of semiconductor-based switching elements, has a high-resistance state of the switching elements so as to avoid (in particular interrupt) and a low-resistance state of the switching elements so as to allow the current flow in the low-voltage circuit,
  a mechanical isolating contact unit MK that is able to be switched by opening contacts so as to avoid a current flow or closing the contacts to allow a current flow in the low-voltage circuit,
  a control unit SE that is connected to the voltage sensor unit SU, the current sensor unit SI, the mechanical isolating contact unit MK and the electronic interruption unit EU.

The mechanical isolating contact unit MK is electrically connected in series with the electronic interruption unit EU.
The control unit SE may:
  be implemented with a digital circuit, for example with a microprocessor (=microcontroller); the microprocessor may also contain an analog part;
  be implemented with a digital circuit having analog circuit parts.

The circuit breaker device SG, in particular the control unit SE, is designed such that, in the event of at least one current threshold value being exceeded, avoidance of a current flow in the low-voltage circuit is initiated, in particular is initiated in a first step by the electronic interruption unit EU.

In other words, in the event of at least one current threshold value being exceeded, this generally being caused by an in particular load-side (ES) short circuit, the electronic interruption unit EU is switched from the low-resistance state to the high-resistance state so as to interrupt the low-voltage circuit.

The circuit breaker device is designed such that the at least one current threshold value is adapted on the basis of the level of the current in the low-voltage circuit.

Specifically or generally, the at least one current threshold value is adapted on the basis of the level of the instantaneous current value. In one variant, the at least one current threshold value may be adapted on the basis of the level of the RMS value or of an average value of the current.

In other words, provision is made for at least one current threshold value in the event of exceedance of the absolute value of which avoidance of a current flow in the low-voltage circuit is initiated. This one current threshold value is then adapted on the basis of the level of the current. This would give a simple solution for the invention.

Provision may also be made for multiple current threshold values; provision may be made in particular for instantaneous/phase angle-related current threshold values, such that an instantaneous or phase angle-related comparison is performed depending on the phase angle of the voltage or of the electric current. These instantaneous or phase angle-related current threshold values may then be adapted on the basis of the level of the current. Particularly in a low-voltage AC circuit, an adapted instantaneous or phase angle-related current threshold value may then be made available quickly, for example for the next half-cycle (or a set of adapted current threshold values for each half-cycle—adaptation every 10 ms in a low-voltage AC circuit with a grid frequency of 50 Hz).

A comparison may take place due to the fact that (in particular periodic) instantaneous current threshold values dependent on the (in particular periodic) temporal characteristic of the level of the voltage or the ascertained instantaneous voltage values are present.

The instantaneous current threshold values may be present continuously or phase angle-wise.

The instantaneous current threshold values may in this case be present per individual phase angle, a phase angle range (multiple phase angles), for example every 2°, or a phase angle section (part of a phase angle), for example every 0.5° or 0.1°. In particular, a resolution of 1° to 5° is particularly advantageous (this corresponds to a sampling rate of 3.5 to 20 kHz).

The instantaneous current values are compared to the instantaneous current threshold values in terms of phase. In the event of the instantaneous current threshold value being exceeded (in terms of absolute value) by the (absolute value of the) instantaneous current value, interruption of the low-voltage circuit is initiated, for example by a first interruption signal TRIP from the control unit SE to the electronic interruption unit EU, as illustrated in FIG. 1.

The electronic interruption unit EU is illustrated as a block in both conductors according to FIG. 1. In a first variant, this is understood to mean no interruption of the two conductors. At least one conductor, in particular the active conductor or phase conductor, has semiconductor-based switching elements. The neutral conductor may be free from switching elements, that is to say without semiconductor-based switching elements. In other words, the neutral conductor is connected directly, that is to say does not become highly resistive. In other words, only a single-pole interruption (of the phase conductor) takes place. If further active conductors/phase conductors are provided, in a second variant of the electronic interruption unit EU, the phase conductors have semiconductor-based switching elements. The neutral conductor is connected directly, that is to say does not become highly resistive. This is the case for example for a three-phase AC circuit.

In a third variant of the electronic interruption unit EU, the neutral conductor may likewise have a semiconductor-based switching element, that is to say, in the event of an interruption of the electronic interruption unit EU, both conductors become highly resistive.

The electronic interruption unit EU may have semiconductor components such as bipolar transistors, field-effect transistors (FETs), insulated-gate bipolar transistors (IGBTs), metal oxide-semiconductor field-effect transistors (MOSFETs) or other (self-commutated) power semiconductors. IGBTs and MOSFETs are particularly suitable for the circuit breaker device according to the invention due to low forward resistances, high blocking layer resistances and good switching behavior.

The circuit breaker device SG may preferably have a mechanical isolating contact system MK according to standards with standard-compliant isolator properties, in order to galvanically isolate the circuit, in particular in order to activate (in contrast to shut down) the circuit in a standard-compliant manner. The mechanical isolating contact system MK is connected to the control unit SE, as illustrated in FIG. 1, such that the control unit SE is able to initiate galvanic isolation of the circuit.

Specifically, a further evaluation may be implemented that brings about galvanic isolation when other criteria are met. By way of example, provision may be made for overcurrent recognition, for example in the control unit SE, such that, in the event of overcurrents, that is to say in the event of current time limit values being exceeded, that is to say when a current that exceeds a current limit value is present for a particular time, that is to say for example exceeds a particular energy threshold value, semiconductor-based or/and galvanic interruption of the circuit takes place.

As an alternative or in addition, galvanic isolation may also be initiated for example in the event of a recognized short circuit.

The galvanic interruption of the low-voltage circuit is initiated for example by a further second interruption signal TRIPG that is transmitted from the control unit SE to the mechanical isolating contact system MK, as illustrated in FIG. 1.

The mechanical isolating contact system MK may perform single-pole interruption in a first variant. In other words, only one conductor of the two conductors, in particular the active conductor or phase conductor, is interrupted, that is to say has a mechanical contact. The neutral conductor is then free from contacts, that is to say the neutral conductor is not connected directly.

If further active conductors/phase conductors are provided, in a second variant, the phase conductors have mechanical contacts of the mechanical isolating contact system. In this second variant, the neutral conductor is connected directly. This is the case for example for a three-phase AC circuit.

In a third variant of the mechanical isolating contact system MK, the neutral conductor likewise has mechanical contacts, as illustrated in FIG. 1.

A mechanical isolating contact system MK is understood to mean in particular a (standard-compliant) isolating function, performed by the isolating contact system MK. Isolating function is understood to mean the following points:
- minimum clearance in air according to standards (minimum distance between the contacts),
- contact position indication for the contacts of the mechanical isolating contact system,
- opening of the mechanical isolating contact system is always possible (no blocking of the isolating contact system caused by handling), so-called free tripping.

With regard to the minimum clearance in air between the contacts of the isolating contact system, this is essentially voltage-dependent. Other parameters are the pollution degree, the type of field (homogeneous, inhomogeneous) and air pressure or height above sea level.

There are corresponding rules or standards for these minimum clearances in air or creepage paths. These rules stipulate for example, in the case of air for a surge withstand capability, the minimum clearance in air for an inhomogeneous and a homogeneous (ideal) electric field on the basis of the pollution degree. The surge withstand capability is the withstand capability when a corresponding surge voltage is applied. The isolating contact system or circuit breaker device has an isolating function (isolator property) only in the presence of this minimum length (minimum clearance in air).

Within the scope of the invention, the DIN EN 60947 and IEC 60947 series of standards are relevant to the isolator function and the properties thereof, to which standards reference is made here.

The isolating contact system is advantageously characterized by a minimum clearance in air between the open isolating contacts in the OFF position (open position, open contacts) on the basis of the rated impulse withstand voltage and the pollution degree. The minimum clearance in air is in particular between (at least) 0.01 mm and 14 mm. The minimum clearance in air is in particular advantageously between 0.01 mm at 0.33 kV and 14 mm at 12 kV, in particular for pollution degree 1 and in particular for inhomogeneous fields.

Advantageously, the minimum clearance in air may have the following values:
E DIN EN 60947-1 (VDE 0660-100):2018-06

TABLE 13

Minimum clearances in air

| Rated impulse withstand voltage $U_{imp}$ | Minimum clearance mm | | | | | | | |
|---|---|---|---|---|---|---|---|---|
| | Case A Inhomogeneous field conditions (see 3.7.63) Pollution degree | | | | Case B Homogeneous field ideal conditions (see 3.7.62) Pollution degree | | | |
| kV | 1 | 2 | 3 | 4 | 1 | 2 | 3 | 4 |
| 0.33 | 0.01 | | | | 0.01 | | | |
| 0.5 | 0.04 | 0.2 | | | 0.04 | 0.2 | | |
| 0.8 | 0.1 | | 0.8 | | 0.1 | | 0.8 | 1.6 |
| 1.5 | 0.5 | 0.5 | | 1.6 | 0.3 | 0.3 | | |
| 2.5 | 1.5 | 1.5 | 1.5 | | 0.6 | 0.6 | | |
| 4.0 | 3 | 3 | 3 | 3 | 1.2 | 1.2 | 1.2 | |
| 6.0 | 5.5 | 5.5 | 5.5 | 5.5 | 2 | 2 | 2 | 2 |
| 8.0 | 8 | 8 | 8 | 8 | 3 | 3 | 3 | 3 |
| 12 | 14 | 14 | 14 | 14 | 4.5 | 4.5 | 4.5 | 4.5 |

NOTE
The values of minimum clearances in air are based on 1,2/50 μs impulse voltage, for barometric pressure of 80 kPa, equivalent to normal atmospheic pressure at 2 000 m above sea level.

The pollution degrees and field types correspond to those defined in the standards. This advantageously makes it possible to achieve a standard-compliant circuit breaker device dimensioned in accordance with the rated impulse withstand voltage.

Figure 2:
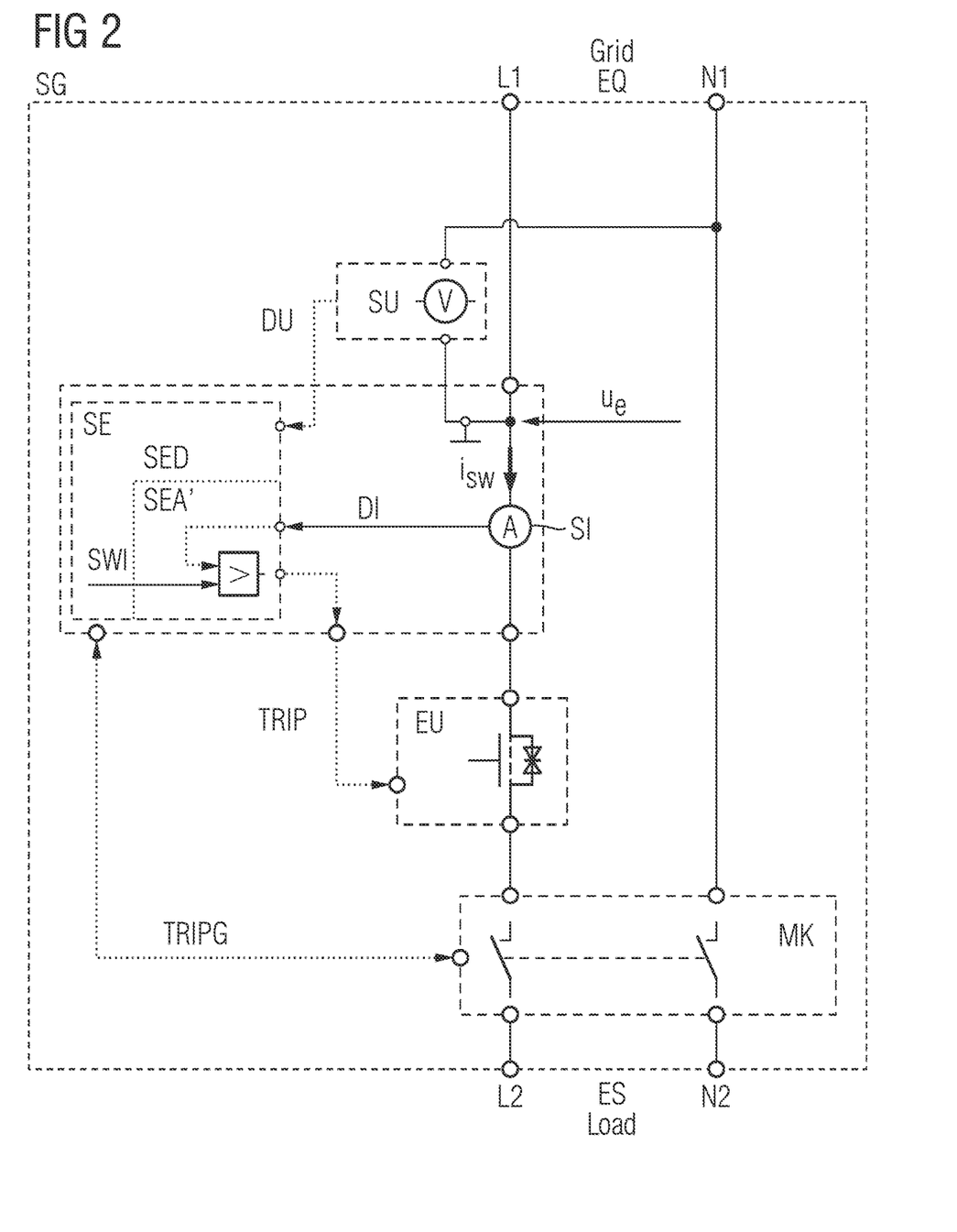
FIG. 2 shows a second illustration of a circuit breaker device.

FIG. 2 shows an illustration according to FIG. 1, with the difference that advantageously (in the series circuit consisting of mechanical isolating contact unit MK and electronic interruption unit EU) the mechanical isolating contact unit MK is assigned to the load-side connections and the electronic interruption unit EU is assigned to the grid-side connections. The electronic interruption unit EU is furthermore designed as a single-pole electronic interruption unit EU, that is to say, in the example, is provided in the phase conductor, that is to say between the connections L1, L2. The electronic interruption unit EU furthermore has (at least) one semiconductor-based switching element (=power semiconductor), which is indicated in FIG. 2. The semiconductor-based switching element furthermore has an overvoltage protection element, which is likewise indicated in FIG. 2. The control unit SE has an analog first subunit SEA and a digital second subunit SED. The digital second subunit SED may for example be a microprocessor or digital signal processor (DSP). The analog first subunit SEA has at least one (current) comparator, as indicated in FIG. 2.

Figure 3:
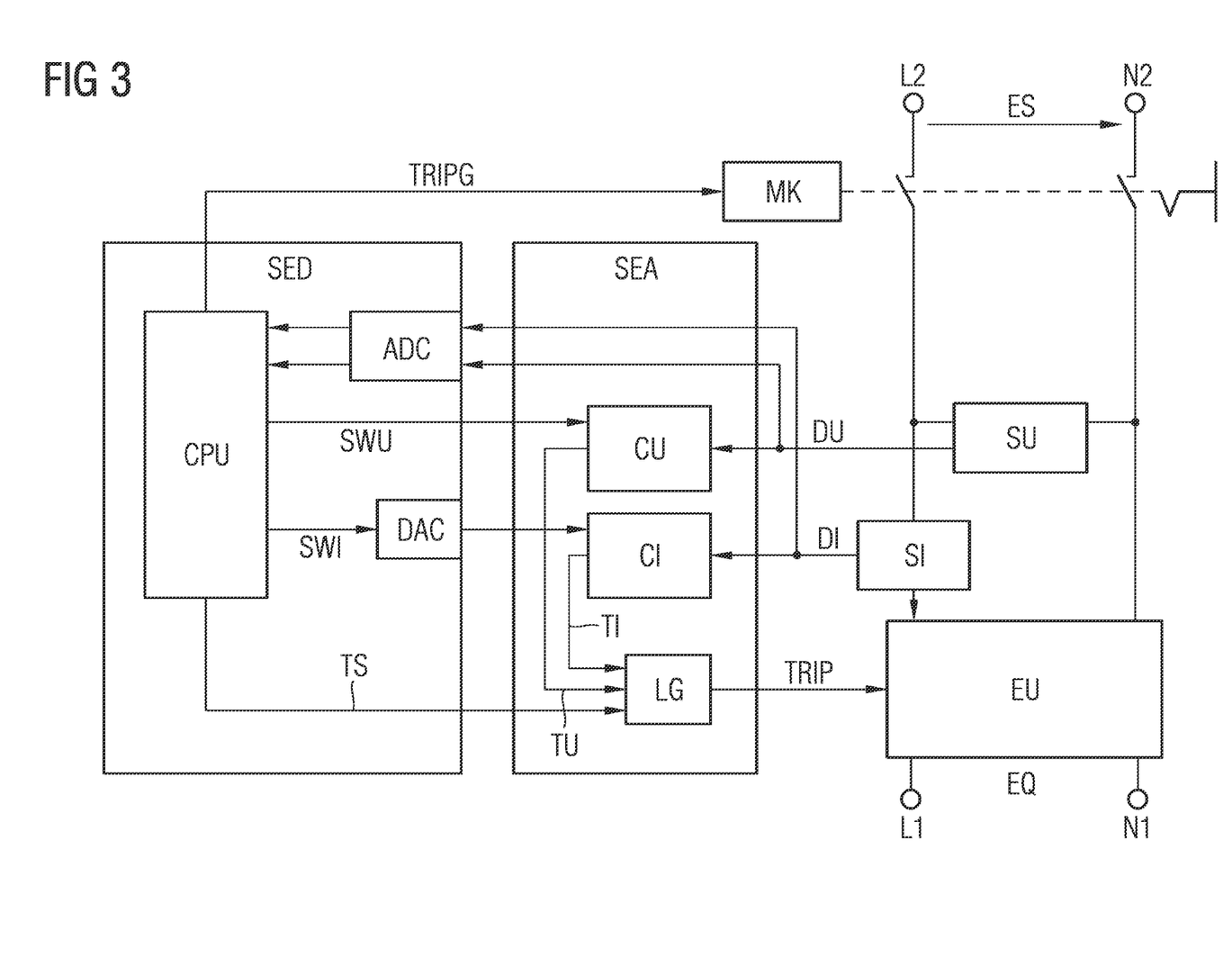
FIG. 3 shows a first embodiment of the circuit breaker device.

FIG. 3 shows an illustration according to FIGS. 1 and 2, having a further detailed embodiment. The control unit SE has two subunits; a preferably analog first subunit SEA and a preferably digital second subunit SED. The first subunit SEA in this case has an analog (current) comparator CI. This is supplied with the instantaneous current values DI from the current sensor unit SI, specifically analog instantaneous current values, on the one hand. On the other hand, the current comparator CI (in the example) is supplied with (a current threshold value or) the instantaneous current threshold values SWI from the second subunit SED. A current comparator is understood here to mean a comparator that compares two (current) magnitudes with one another, wherein in this case in particular equivalents of the level of the current are compared with one another (for example two voltages whose voltage level represents in each case the current level or the level of the current threshold value).

The (analog) instantaneous current threshold values are in particular an analog voltage characteristic.

The current comparator CI compares the (analog) instantaneous current values DI with the (analog) instantaneous current threshold values SWI and outputs, as described, in the event of exceedance (in particular in terms of absolute value), a first current interruption signal TI so as to initiate interruption of the low-voltage circuit.

The current interruption signal TI may be supplied to a logic unit LG, which combines it with other interruption signals and outputs the first interruption signal TRIP for semiconductor-based interruption or high-resistance interruption to the electronic interruption unit EU.

The analog (current) comparator makes it possible in particular to achieve immediate, that is to say very quick, recognition of the exceedance; this usually takes place in the ns range, that is to say between 1 and 100 ns.

In comparison therewith, a digital system would react at present in the μs range, that is to say for example between 2-100 μs, due to the computing and reaction times.

In one embodiment, the current comparator CI buffer stores the instantaneous (current) threshold values SWI in order to have the values constantly available.

The instantaneous current threshold values SWI are synchronized with the temporal characteristic of the instantaneous voltage values (the temporal characteristic of the voltage). As a result, in the case of a small instantaneous voltage (phase angle of a sinusoidal AC voltage of for example −30° to 0° to 30°), low instantaneous current threshold values SWI are used (or are present) and, in the case of a high instantaneous voltage (phase angle of a sinusoidal AC voltage of for example 60° to 90° to 120°), high current threshold values SWI are used (or are present). As a result, for example, the trip time is advantageously largely independent of the phase angle of the voltage, and so the trip time is below a temporal first threshold value.

The (analog) instantaneous current values DI and the (analog) instantaneous voltage values DU are additionally supplied to the second subunit SED. In one preferred embodiment, the instantaneous current values DI or/and instantaneous voltage values DU are digitized there by an analog-to-digital converter ADC and supplied to a microprocessor (=microcontroller) CPU. This ascertained or computed the instantaneous current threshold values SWI, on the basis of the level of the current/of the supplied instantaneous current values DI. The instantaneous current threshold values SWI ascertained by the second subunit SED or in particular the microprocessor CPU are in turn supplied to the first subunit SEA (by a digital-to-analog converter DAC), in particular to the current comparator CI, in order to perform the comparison described above.

The second subunit SED or the first subunit SEA may have a digital-to-analog converter DAC in order to convert the (digital) current threshold values SWI computed in the second subunit SED into analog current threshold values SWI, in order to perform an analog comparison in the first analog subunit SEA. In the example according to FIG. 3, the digital-to-analog converter DAC is part of the second (digital) subunit SED (or assigned thereto).

In this case, the instantaneous current threshold values SWI may advantageously be ascertained digitally in the second subunit SED or with a slower processing speed than the continuous comparison of analog instantaneous current values DI with the analog instantaneous current threshold values SWI in the first subunit SEA. This is advantageous as the analog comparison of the current value takes place more quickly than the processing time or computing time of the digital second subunit SED.

The phase-accurate comparison is generally ensured by the fast processing speeds of the analog-to-digital converter ADC, microprocessor (=microcontroller) CPU and digital-to-analog converter DAC in comparison with the frequency of the low-voltage circuit, which is generally 50 hertz in Europe.

In one advantageous embodiment of the invention, the first subunit SEA may have a voltage comparator CPU. This is supplied with the instantaneous voltage values DU of the voltage sensor SU, on the one hand. On the other hand, the voltage comparator CU is supplied with instantaneous voltage threshold values SWU by the second subunit SED.

The voltage comparator CU compares the instantaneous voltage values DU with the instantaneous voltage threshold values SWU and, in the event of exceedance or falling below or a range check, outputs a voltage interruption signal TU so as to initiate interruption of the low-voltage circuit.

The voltage interruption signal TU may be supplied to the logic unit LG, which combines it with the one or more other interruption signals and outputs the first interruption signal TRIP for the semiconductor-based interruption or high-resistance interruption to the electronic interruption unit EU.

In one embodiment, the voltage comparator CU buffer stores the instantaneous threshold values SWU in order to have the values constantly available.

In one embodiment, the microprocessor CPU ascertains or computes the instantaneous voltage threshold values SWU. The instantaneous voltage values SWU ascertained by the second subunit SED or in particular the microprocessor CPU are supplied in turn to the first subunit SEA, in particular to the voltage comparator CU, in order to perform the comparison described above. The digital instantaneous voltage threshold values SWU may be converted into analog instantaneous voltage threshold values SWU by a further digital-to-analog converter, not illustrated. These instantaneous voltage threshold values are compared with the analog instantaneous voltage values DU by the voltage comparator CU.

In this case, the instantaneous voltage threshold values SWU may advantageously be ascertained digitally in the second subunit SED or at a slower processing speed than the continuous comparison of instantaneous voltage values DU and instantaneous voltage threshold values SWU in the first subunit SEA.

Depending on the embodiment, a second interruption signal TRIPG may be output by the second subunit SED of the control unit SE, in particular by the microprocessor CPU, to the mechanical isolating contact system MK so as to galvanically interrupt the low-voltage circuit, as illustrated in FIG. 3.

The embodiment of the control unit with an analog first subunit and a digital second subunit has the particular advantage that an efficient architecture is present. The first analog subunit is able to perform a very fast comparison of instantaneous values and threshold values, thereby enabling fast short-circuit recognition. The second subunit may perform a threshold value computation or adaptation that is independent thereof, according to the invention depending on the level of the current, that does not have to be performed as quickly as the recognition. The threshold values may for example be buffer stored in order to be available for a fast comparison. The threshold values do not have to be adapted constantly.

Figure 4:
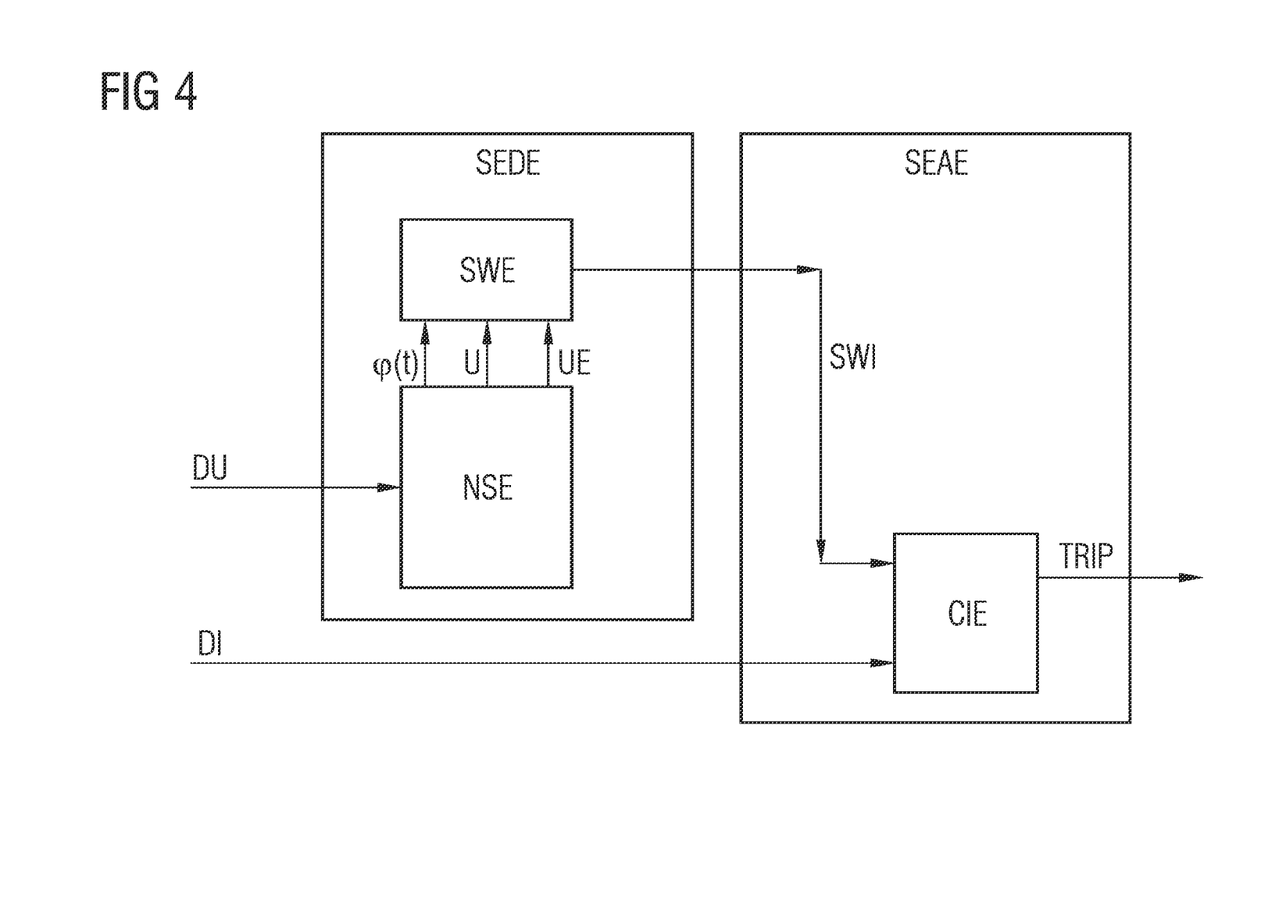
FIG. 4 shows a second embodiment of the circuit breaker device.

FIG. 4 shows a further embodiment or variant according to FIGS. 1 to 3. FIG. 4 shows part of a simple variant of the preferably analog first subunit SEAE and part of an alternative variant of the preferably digital second subunit SEDE.

The part of the simple variant of the first subunit SEAE has the current comparator CIE, to which the instantaneous current values DI, in particular for example their absolute value, and the instantaneous current threshold values SWI, in particular also in terms of absolute value, are supplied. The current comparator CIE in this example directly outputs the first interruption signal TRIP so as to interrupt the low-voltage circuit, in the same way as the previous figures. The absolute value may be computed by one or further units that are not illustrated. The part of the alternative variant of the second subunit SEDE has a grid synchronization unit NSE. This is supplied with the (analog) instantaneous voltage values DU. The grid synchronization unit NSE ascertains, from the supplied (analog) instantaneous voltage values DU, which are for example a sinusoidal AC voltage of the low-voltage circuit, the phase angle $\varphi(t)$ of the voltage.

As an alternative, the amplitude U and an expected temporal value of the voltage UE or expected value of the voltage UE may also additionally be ascertained.

The expected value of the voltage UE is in this case a type of filtered or regenerated or generated equivalent instantaneous voltage value DU.

The phase angle φ(t) (and also the expected value of the voltage UE or the amplitude U) of the voltage DU may for example be ascertained by a so-called phase-locked loop or PLL for short. A PLL is an electronic circuit arrangement or a software-programmed variant in the microcontroller that influences the phase and thus accordingly the frequency of a changeable oscillator via a closed control loop such that the phase difference between an external periodic reference signal (instantaneous voltage values) and the oscillator or a signal derived therefrom is as constant as possible.

This makes it possible to ascertain inter alia the phase angle φ(t), the fundamental frequency and the amplitude thereof of the supplied grid voltage, that is to say the ascertained voltage values, that is say for example also the (untouched or filtered) expected value of the (grid) voltage.

The phase angle φ(t) ascertained by the grid synchronization unit NSE (and possibly the amplitude U or/and the expected temporal value of the voltage UE) are supplied to a threshold value unit SWE. The threshold value unit SWE may have a (scaled) curve for the (phase-related) instantaneous current threshold values SWI. By way of example, in the case of a sinusoidal AC voltage of the low-voltage circuit, an (approximately) sinusoidal current threshold value curve, that is to say a characteristic that is sinusoidal in terms of height of the instantaneous current threshold values SWI over the phase angles 0° to 360° or the period duration (or the (corresponding) time).

The circuit breaker device SG may have a, in particular a single, setting element. This in particular single setting element on the circuit breaker device SG makes it possible to set a limit value or maximum value for the current threshold value. As an alternative, the limit value or maximum value for the current threshold value may also be fixedly prescribed or programmed.

According to the invention, the current threshold value curve is then scaled with regard to this limit value or maximum value for the current threshold value as set or fixedly prescribed by way of the setting element. By way of example, the amplitude (that is to say the maximum value) of the current threshold value curve may be scaled with the limit value/maximum value for the current threshold value.

By way of example, the maximum value of the current threshold value may be 4 times the amplitude of a nominal current (that is to say at least the current that has to be carried at all times by the circuit breaker device, depending on the standard) of the circuit breaker device; for example, normal circuit breaker devices have a nominal current of for example 16 A. In the example, this results in a maximum value of the current threshold value of:

90 A=(root 2)*16 A*4.

(root 2=>amplitude of the nominal current value).

The instantaneous current threshold values SWI, owing to the presence of the phase angle φ(t) of the voltage in the threshold value unit SWE, may be transmitted thereby, synchronously with the instantaneous current value DI, to the current comparator CIE, such that a phase-related (phase angle-related) comparison between the instantaneous current value DI and the instantaneous current threshold value SWI may take place.

Figure 5:
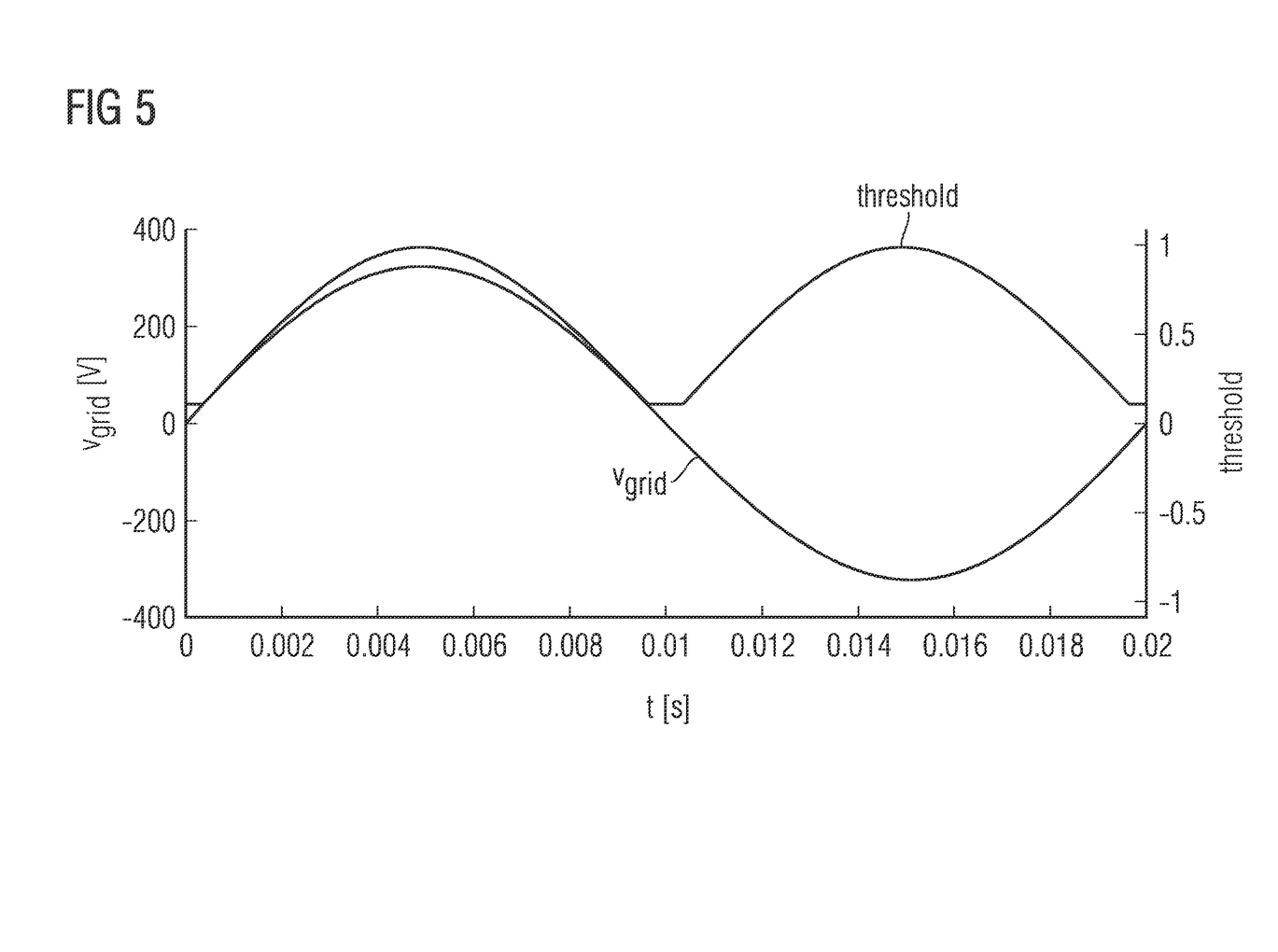
FIG. 5 shows voltage and current threshold value characteristics over time.

FIG. 5 shows, on the one hand, the characteristic of the level of a grid-side voltage Vgrid in volts [V], on the left-hand vertical axis, of a period of a sinusoidal AC voltage over time t in s [s], on the horizontal axis, for example of a sinusoidal AC voltage in the low-voltage AC circuit. In this case, the instantaneous voltage values of the voltage are indicated over time, with time being proportional to the phase angle (f=50 Hz).

On the other hand, said figure shows a phase angle-related or phase angle-dependent (absolute value) scaled (0 to 1) instantaneous current threshold value threshold, on the right-hand vertical axis, over time t in s [s]. The temporal (scaled) characteristic of the instantaneous current threshold values threshold in this case corresponds to the (phase angle-related) instantaneous current threshold values SWI.

The temporal characteristic of the instantaneous current threshold value (threshold) is governed here by the absolute value characteristic of the voltage, that is to say the characteristic, in the region of the positive voltage half-cycle, is the same as the characteristic in the region of the negative voltage half-cycle.

The temporal (scaled) characteristic of the instantaneous current threshold values threshold is scaled in accordance with the limit value/maximum value for the current threshold value according to the invention as set or fixedly prescribed by way of the setting element. For example, the amplitude (scaling 1) is set to 100 A, or for example 5 times the nominal current. In the case of a nominal current of for example 16 A, to for example 5*16 A*1.414(root 2)=113 A.

(root 2=>peak value of the instantaneous value of the current).

Generally speaking, the characteristic of the instantaneous current threshold values threshold corresponds to the characteristic of the voltage in the circuit, as illustrated in FIG. 5. In other words, for example in the case of a triangular voltage characteristic, a triangular current threshold value curve would be used. The background is that the level of the voltage defines the level of the (short-circuit) current. According to the invention, in the case of a high current, low threshold values are therefore used and, in the case of a low current, high threshold values are used in order to enable fast, phase angle-independent short circuit recognition.

According to FIG. 5, the (periodic) instantaneous current threshold values SWI have a minimum value. In other words, the sinusoidal curve is not ideal (only roughly or approximately sinusoidal). The minimum value is greater than zero. The minimum value is in particular greater than 5%, 10% or 20% of the maximum value. More specifically, this minimum value may be in the range of 5 to 20% of the maximum value, for example (at) 10% or 15%, that is to say the amplitude of the current threshold value curve threshold. The minimum value occurs at the location or in the region of the zero-crossing of the (sinusoidal) curve for the current threshold values.

In the case of a temporally sinusoidal voltage characteristic in the low-voltage AC circuit, the temporal characteristics of voltage and current threshold values are synchronized in terms of phase such that the time of the amplitude (maximum value) of the voltage matches the time of the amplitude (maximum value) of the current threshold value, as shown in FIG. 5. The region of the zero-crossing of the voltage also matches the region of the minimum value of the current threshold value.

The phase angle resolution defines the speed of the computing of the threshold values. With a phase angle resolution of 1°, that is to say a threshold value is present for each full phase angle of the voltage, that is to say an instantaneous threshold value is present roughly every 55.5 µs. The shutdown is preferably performed by an analog comparator, that is to say continuously, and is thus significantly faster (for example in the nanosecond range) than the phase angle resolution.

As an alternative, the following temporal characteristic applies in the case of fully digital processing. The phase angle resolution defines the speed of the recognition. With a phase angle resolution of 1°, that is to say a threshold value is present for each full phase angle of the voltage, that is to say an instantaneous threshold value is present roughly every 55.5 µs, this means that shutdown is able to take place after a minimum of around 60 µs. It is possible to achieve shorter shutdown times with higher phase angle resolutions.

In this example, the values are then processed at at least 18 kHz.

The current threshold values may also be stored (in scaled form) in a table, with the value then possibly being adapted.

The current threshold values may for example be computed generally or with reference to the table as follows:

Variant A (slow, average value of the RMS value):

An RMS value averaged over a first time interval is computed in particular from the digital instantaneous current values. The averaged RMS value is compared with the nominal current of the protection device for an exceedance. The current threshold value is adapted on the basis of the level by which the averaged RMS value exceeds the nominal current. In particular, the at least one current threshold value is reduced by a percentage dependent on the level of the exceedance of the nominal current in order to obtain an adapted (reduced) current threshold value. In the case of the averaged RMS value exceeding the nominal current by for example 20%, the current threshold value is reduced by for example 30%. Other scaling factors of the current threshold value are likewise possible (for example 30% exceedance could also perform a 20% reduction). As a possible general variant: percentage of the threshold value reduction=percentage of the exceedance multiplied by a first scaling factor.

The first scaling factor may for example be 1, greater than one, or less than one.

The first time interval may be a grid period (20 ms at 50 Hz) or else a multiple (up to 50 times, that is to say 1 s) of a grid period.

Variant B (Fast, Instantaneous Value):

A current value averaged over a second time interval is computed in particular from the digital instantaneous current values. The averaged current value is compared with the nominal current of the protection device for an exceedance. The current threshold value is adapted on the basis of the level by which the averaged current value exceeds the nominal current. In particular, the at least one current threshold value is reduced by a percentage dependent on the level of the exceedance of the nominal current in order to obtain an adapted (reduced) current threshold value. In the case of the averaged current value exceeding the nominal current by for example 100%, the current threshold value is reduced by for example 20%. Other scaling factors of the current threshold value are likewise possible (for example, 200% exceedance could also perform a 30% reduction). As a possible general variant: percentage of the threshold value reduction=percentage of the exceedance multiplied by a second scaling factor.

The second scaling factor may for example be 1 or be less than one.

The second time interval may be part of a grid period (20 ms at 50 Hz). For example, less than 10 ms, 5 ms, in particular less than 2 ms, 1 ms or 0.1 ms (any intermediate value is possible and disclosed).

Although the invention has been described and illustrated in more detail by the exemplary embodiment, the invention is not restricted by the disclosed examples and other variations may be derived therefrom by a person skilled in the art without departing from the scope of the invention.

The invention claimed is:

1. A circuit breaker device for protecting an electrical low-voltage circuit, the circuit breaker device comprising:
   a housing having first connections and second connections for conductors of the low-voltage circuit;
   a series circuit of a mechanical isolating contact unit and an electronic interruption unit electrically connected between said first and second connections;
   said mechanical isolating contact unit being configured to be selectively switched by opening contacts to avoid a current flow or by closing the contacts to allow a current flow in the low-voltage circuit;
   said electronic interruption unit being configured to be selectively switched by semiconductor-based switching elements to a high-resistance state of said switching elements to avoid a current flow or to a low-resistance state of said switching elements to allow a current flow in the low-voltage circuit;
   a current sensor unit for ascertaining a level of an instantaneous current of the low-voltage circuit to output instantaneous current values;
   a control unit connected to said current sensor unit, to said mechanical isolating contact unit, and to said electronic interruption unit, and configured to initiate an avoidance of a current flow in the low-voltage circuit when at least one current threshold value is being exceeded; and
   wherein the circuit breaker device is configured to adapt and vary the at least one current threshold value on a basis of the level of the current in the low-voltage circuit; and
   wherein the at least one current threshold value is adapted on a basis of a level of the current by, in a case of an increasing current, reducing the at least one current threshold value and by, in a case of a decreasing current, increasing the at least one current threshold value.

2. The circuit breaker device according to claim 1, configured to adapt the at least one current threshold value on a basis of a level of the instantaneous current value.

3. The circuit breaker device according to claim 1, configured to adapt the at least one current threshold value on a basis of a level of an RMS value or an average value of the current.

4. The circuit breaker device according to claim 1, wherein:
   said first connections are grid-side connections and said second connections are load-side connections; and
   said mechanical isolating contact unit is assigned to said load-side connections and said electronic interruption unit is assigned to said grid-side connections.

5. The circuit breaker device according to claim 1, wherein the at least one current threshold value is increased up to a maximum value of the at least one current threshold value.

6. The circuit breaker device according to claim 1, further comprising an analog comparator configured to compare the instantaneous current value of the ascertained level of the current with the at least one current threshold value and wherein, when the at least one current threshold value is being exceeded, the avoidance of the current flow in the low-voltage circuit is initiated.

7. The circuit breaker device according to claim 6, wherein:
the at least one current threshold value is computed digitally, the computed digital current threshold value is converted into an analog current threshold value by a digital-to-analog converter; and
said comparator is connected to receive the analog current threshold value.

8. The circuit breaker device according to claim 1, configured for:
converting the instantaneous current values into digital current values;
computing an RMS value or an RMS value averaged over a first time interval from the digital current values; and
reducing the current threshold value on a basis of a level by which the RMS value or averaged RMS value exceeds a nominal current in order to obtain an adapted current threshold value.

9. The circuit breaker device according to claim 1, configured for:
converting the instantaneous current values into digital current values;
computing a current value averaged over a second time interval from the digital current values; and
reducing the current threshold value on a basis of a level by which the averaged current value exceeds a nominal current in order to obtain an adapted current threshold value.

10. A circuit breaker device for protecting an electrical low-voltage circuit, the circuit breaker device comprising:
a housing having first connections and second connections for conductors of the low-voltage circuit;
a series circuit of a mechanical isolating contact unit and an electronic interruption unit electrically connected between said first and second connections;
said mechanical isolating contact unit being configured to be selectively switched by opening contacts to avoid a current flow or by closing the contacts to allow a current flow in the low-voltage circuit;
said electronic interruption unit being configured to be selectively switched by semiconductor-based switching elements to a high-resistance state of said switching elements to avoid a current flow or to a low-resistance state of said switching elements to allow a current flow in the low-voltage circuit;
a current sensor unit for ascertaining a level of an instantaneous current of the low-voltage circuit to output instantaneous current values;
a control unit connected to said current sensor unit, to said mechanical isolating contact unit, and to said electronic interruption unit, and configured to initiate an avoidance of a current flow in the low-voltage circuit when at least one current threshold value is being exceeded; and
wherein the circuit breaker device is configured to adapt and vary the at least one current threshold value on a basis of the level of the current in the low-voltage circuit;
a voltage sensor unit connected to said control unit and configured to ascertain a level of the voltage of the low-voltage circuit, to provide instantaneous voltage values;
wherein instantaneous current threshold values that are dependent on the instantaneous voltage values are present;
wherein the instantaneous current values are compared with the instantaneous current threshold values, and wherein, when the absolute value of the instantaneous current threshold value is exceeded, the interruption of the low-voltage circuit is initiated.

11. The circuit breaker device according to claim 10, wherein the instantaneous current threshold values are periodic current threshold values that are dependent on periodic temporal characteristic of the instantaneous voltage values and wherein a phase of the instantaneous current values is compared with a phase of the instantaneous current threshold values.

12. The circuit breaker device according to claim 10, wherein:
the low-voltage circuit has a temporally sinusoidal voltage characteristic;
the instantaneous current threshold values have a temporally approximately sinusoidal current threshold value characteristic with a minimum value that is greater than zero; and
the temporal characteristics of voltage and current threshold values are synchronized in terms of phase such that a time of an amplitude of the voltage matches a time of an amplitude of the current threshold value.

13. The circuit breaker device according to claim 12, wherein the instantaneous current threshold values have a temporally approximately sinusoidal current threshold value characteristic in terms of absolute value, and the minimum value is greater than 20% of the maximum value.

14. The circuit breaker device according to claim 11, wherein a region of the zero-crossing of the voltage matches a region of a minimum value of the current threshold value.

15. A method of protecting an electrical low-voltage circuit in a circuit breaker device, the method comprising:
providing the circuit breaker device with a mechanical isolating contact unit that is connected in series with an electronic interruption unit;
wherein the mechanical isolating contact unit is configured to be switched by opening contacts so as to avoid a current flow or closing the contacts to allow a current flow in the low-voltage circuit;
wherein the electronic interruption unit is configured to be switched by semiconductor-based switching elements to a high-resistance state of the switching elements to avoid a current flow or to a low resistance state of the switching elements to allow the current flow in the low-voltage circuit;
ascertaining a level of the current of the low-voltage circuit to provide instantaneous current values;
when the instantaneous current value exceeds at least one current threshold value, initiating an avoidance of the current flow of the low-voltage circuit; and
adapting the at least one current threshold value on a basis of a level of the current in the low-voltage circuit such that, in a case of an increasing current, the at least one current threshold value is reduced and that, in a case of a decreasing current, the at least one current threshold value is increased up to a maximum value thereof.

16. A computer program product, comprising computer-readable commands which, when the program is executed by a microcontroller, the microcontroller is prompted to aid or perform the method according to claim 15.

17. A computer-readable storage medium storing thereon a non-transitory computer program product which, when a corresponding computer program is executed on a computer, is configured to execute the method according to claim 15.

18. A method of protecting an electrical low-voltage circuit in a circuit breaker device, the method comprising:

providing the circuit breaker device with a mechanical isolating contact unit that is connected in series with an electronic interruption unit;

wherein the mechanical isolating contact unit is configured to be switched by opening contacts so as to avoid a current flow or closing the contacts to allow a current flow in the low-voltage circuit;

wherein the electronic interruption unit is configured to be switched by semiconductor-based switching elements to a high-resistance state of the switching elements to avoid a current flow or to a low resistance state of the switching elements to allow the current flow in the low-voltage circuit;

ascertaining a level of the current of the low-voltage circuit to provide instantaneous current values;

when the instantaneous current value exceeds at least one current threshold value, initiating an avoidance of the current flow of the low-voltage circuit; and adapting the at least one current threshold value on a basis of a level of the current in the low-voltage circuit; and when a nominal current of the circuit breaker device is exceeded, reducing the at least one current threshold value by a percentage that is dependent on a level of the exceedance of the nominal current in order to obtain an adapted current threshold value.

* * * * *